United States Patent [19]

Mashikian

[11] Patent Number: 5,210,676
[45] Date of Patent: May 11, 1993

[54] ELECTRICAL PROTECTIVE DEVICE

[76] Inventor: Matthew S. Mashikian, 525 Gurleyville Rd., Storrs, Conn. 06268

[21] Appl. No.: 668,867

[22] Filed: Mar. 13, 1991

[51] Int. Cl.⁵ .................. H02G 15/06; H01F 27/34
[52] U.S. Cl. .................................... 361/117; 361/127
[58] Field of Search .................. 361/132, 111, 117

[56] References Cited

U.S. PATENT DOCUMENTS

| | | | |
|---|---|---|---|
| 3,673,305 | 6/1972 | Mashikian et al. | 174/12 |
| 3,711,794 | 1/1973 | Tasca et al. | 333/96 |
| 3,777,219 | 12/1973 | Winters | 317/61.5 |
| 3,821,686 | 6/1974 | Harnden, Jr. | 338/21 |
| 3,876,820 | 4/1975 | Mashikian | 174/19 |
| 4,021,759 | 5/1977 | Campi | 333/20 |
| 4,587,589 | 5/1986 | Marek | 361/56 |

FOREIGN PATENT DOCUMENTS 0388779 3/1990 European Pat. Off. .

Primary Examiner—A. D. Pellinen
Assistant Examiner—S. Jackson

[57] ABSTRACT

An electric protective device for protecting a cable, its termination or other apparatus from the effect of lightning strikes on an overhead line to which the apparatus is connected comprises a tubular insulator combined with a surge arrester and integrated by common terminals at the ground and high voltage ends. The insulator and the surge arrester are concentrically disposed about the conductor in a common insulated structure to eliminate connecting leads therebetween and the voltage drop which occurs across such leads during a rapid rise in current. The surge arrester may contribute all or part of the electrical stress grading required in the termination.

11 Claims, 4 Drawing Sheets

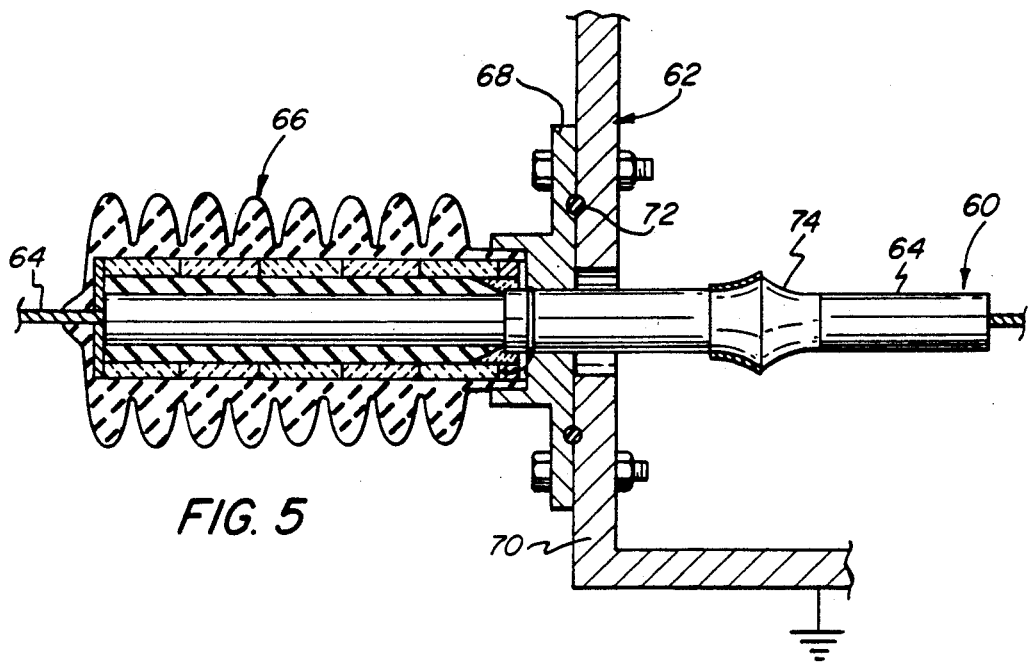
FIG. 5
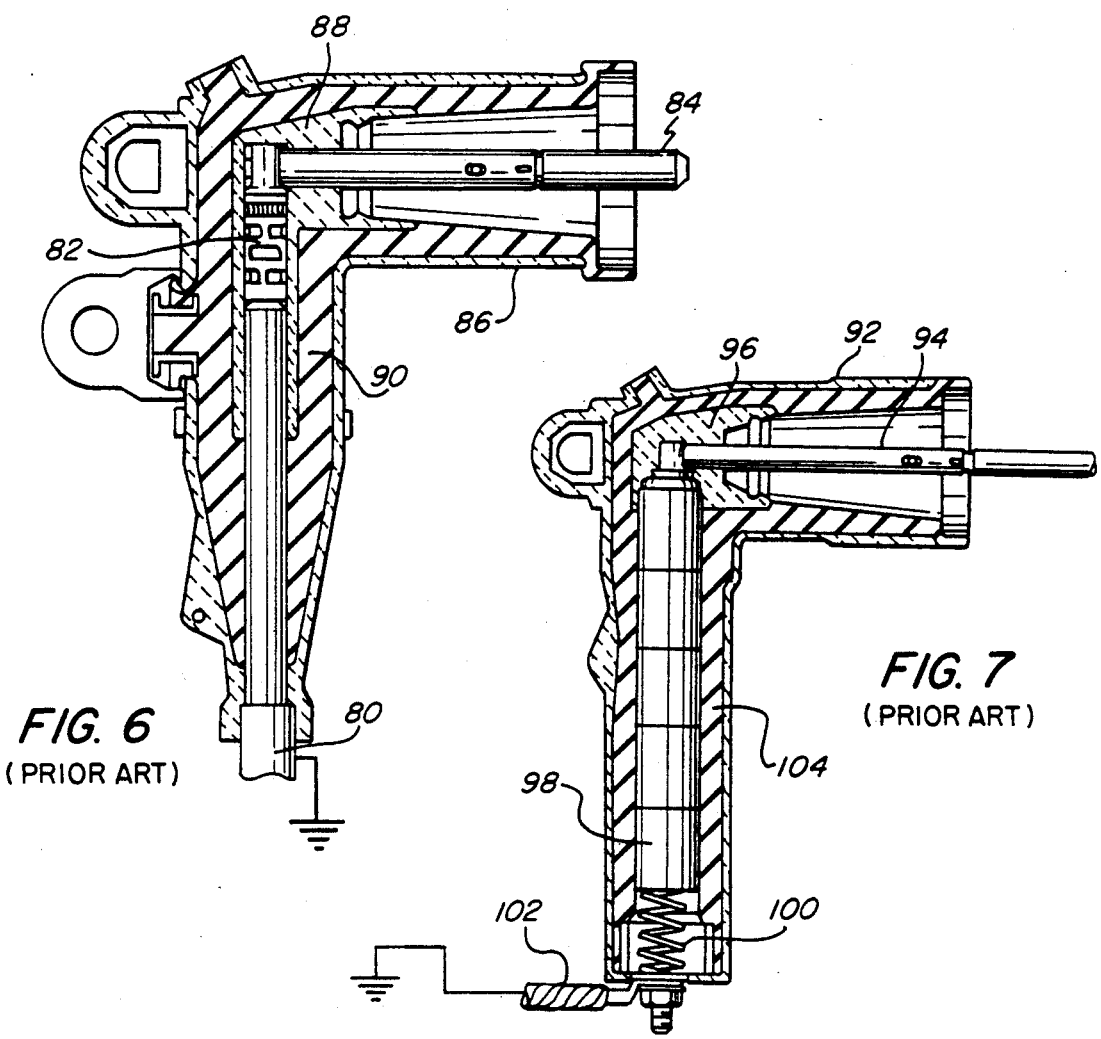
FIG. 6
(PRIOR ART)
FIG. 7
(PRIOR ART)

ELECTRICAL PROTECTIVE DEVICE

BACKGROUND OF THE INVENTION

The present invention relates to electric circuit protective devices and, more particularly, to cable termination devices for protecting electric cables and/or other electrical equipment which are connected to overhead electric lines from the effect of lightning strikes on the overhead lines or other voltage surges.

Medium and high-voltage cables are normally connected to overhead lines by pothead insulator terminations, and to transformers by comparable bushing or elbow connector insulators. In each case, an insulated conductor passes through the device and surge protection is conventionally provided by a surge arrester electrically connected in parallel with the insulator. The arrester consists essentially of a body of voltage-dependent resistors made of semi-conductor material (typically metallic oxide ceramics) which exhibits a very high resistance and draws negligible current at service voltage but exhibits very low resistance and draws large currents (without generating proportionally large amounts of heat) when exposed to high voltage in a surge.

Surges due to lightning strikes can have extremely rapid rates of current increase (rates as high as $10^{11}$ amperes per second have been observed) and, under such circumstances, the inductance of even a few decimeters of a connecting lead, and the consequent voltage drop across it, can be very significant.

One of the problems in protective devices which has been discussed is the effect of the surge arrester leads. As the surge assumes a steeper rate of rise upon restrikes, the voltage across the arrester leads becomes more important. Lightning surges will prematurely age cables. The rate of aging increases as the magnitude of the voltage surge increases. Therefore, it is very important to limit as much as possible the magnitude of these surges.

It is an object of the present invention to provide a novel electrical protective device providing surge arresting properties for high voltage connections to overhead line in which the length of connecting leads is substantially reduced.

It is also an object to provide such a device in which the surge arresting and cable termination functions are provided in a common housing with highly desirable insulating characteristics.

Another object is to provide such a device which may be assembled readily and which will exhibit relatively long life.

SUMMARY OF THE INVENTION

It has now been found that the foregoing and related objects may be readily attained in an electric protective device for a high voltage cable termination from an overhead transmission line comprising a tubular insulator through the center of which an insulated conductor passes and which, when in service, will be exposed to the voltage of the conductor at one of its ends and to a ground voltage at its other end. A surge arrester is concentrically disposed about the tubular insulator, and the insulator and surge arrester having common terminals at their ground and high voltage ends.

Preferably, the surge arrester is of tubular configuration and disposed concentrically about the tubular insulator, and an outer insulator is disposed about the surge arrester. The surge arrester contributes to electrical stress grading of the termination, and desirably is the sole stress grading means.

In the preferred construction, the surge arrester is comprised of a stack of rings of a semi-conductor voltage dependent resistance material. Conductive elements extend across ends of the surge arrester and insulator to provide the common terminals therefor, and spring means bias the rings into good electrical contact with each other and with the conductive elements.

BRIEF DESCRIPTION OF THE DRAWINGS

FIG. 5 is a cross sectional view illustrating the device of FIG. 3 used as a bushing insulator;

FIG. 6 is a cross sectional view of a prior art elbow connector;

FIG. 7 is a cross sectional view of a prior art elbow surge arrester; and

DETAILED DESCRIPTION OF PREFERRED EMBODIMENT OF THE INVENTION

Figure 1:
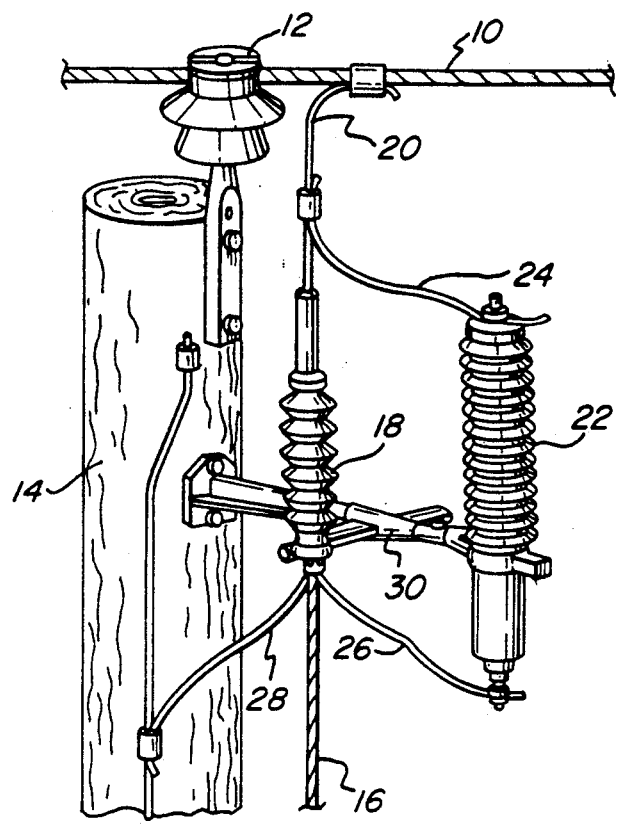
FIG. 1 is a fragmentary perspective view of one conventional combination of a pothead termination and surge arrester in a connection to an overhead transmission line.
Figure 2:
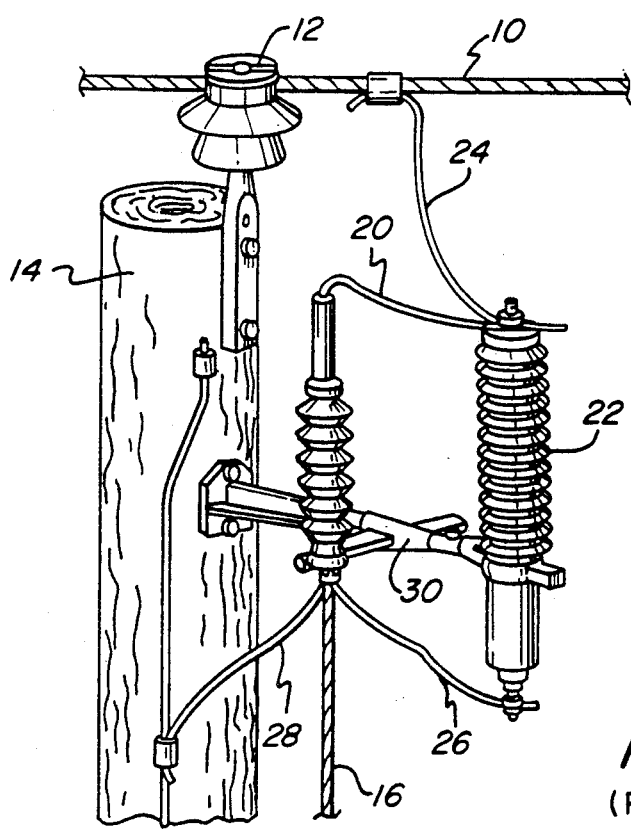
FIG. 2 is a similar view showing a preferred conventional arrangement which is also used.

The motivating technical need for this invention is illustrated in FIGS. 1 and 2 which represent two common methods for terminating in open air shielded power cables and providing surge protection for same. In FIG. 1, should a high surge current flow through the arrester, the voltage impressed across the cable insulation is evaluated as the sum of the voltage drop across the leads and across the arrester. This latter is usually designed to limit the voltage to an acceptably low value, in spite of the very high surge current magnitudes. However, the voltage drops across the leads are obtained by multiplying the inductance of the leads by the time rate at which the surge current rises. To reduce the voltage drop across the leads, their inductance must be reduced. The inductance is directly proportional to the lead length and varies with its size and proximity to other conductors (configuration).

Taking into consideration the practical design limitations of size and configuration, the most obvious alternative for reducing the inductance has been traditionally the shortening of the lead length as shown in FIG. 2 where one lead has been eliminated. In any realistic line construction, it has been impossible to reduce the ground lead below approximately 12 inches because of practical and technical considerations. If a surge current rising at the rate of 10,000 amperes per microsecond is diverted through an arrester whose lead length has an inductance of one (1) microhenry, a voltage drop of 10,000 volts occurs across the lead. The voltage drop is often objectionably high, especially if the cable or its terminal equipment has deteriorated with service life. Lightning surges with this and higher rates of rise have been recorded and prudent engineering requires that the cable be adequately protected against them.

The high voltage power cable generally comprises a central conductor surrounded by a concentric layer of semi-conducting material (conductor shield), in turn surrounded by a concentric layer of insulation. This, in turn, is surrounded by another concentric layer of semi-conducting material (insulation shield) which is finally covered with a metal neutral conductor. The insulation shield and the neutral conductor are maintained at ground potential while the central conductor is energized at elevated potential. To terminate such a cable to a bare electrical conductor, the insulation shield is cut back. In this configuration, the voltage rises abruptly from zero at the edge of the cutback shield to 60 or more percent of the total conductor voltage approximately one inch away over the insulation surface. This abrupt voltage rise produces a high gradient capable of causing an electric arc (flashover) and damaging the cable termination. To reduce this gradient, or electric stress, combinations of solutions are utilized, one of which requires the use of stress relief devices adjacent to the cutback edge of the shield, and the other requires capacitive or resistive means to grade the voltage evenly from the cutback edge to the conductor.

A modern surge arrester consists basically of a stack of cylindrical, nonlinear ceramic (metal oxide) resistors contained in a porcelain or other arc-resistant insulating material. The device is connected between two points of a circuit across which the voltage needs to be limited. The nonlinearity of the device is such that negligible current is drawn under normal conditions. However, large currents are conducted through the arrester during the short durations of overvoltage surges, thus clamping down the voltage across it to acceptable levels.

The two prior art electric circuit termination devices are shown in FIGS. 1 and 2.

As shown in FIG. 1, an electric power line comprises at least one overhead conductor 10 supported on insulators 12 mounted on wooden poles 14. A tap or other connection to the conductor 10 is made by means of an insulated conductor (cable) 16 terminated by a pothead insulator 18 and a wire conductor 20. A surge arrester 22 is mounted parallel to the pothead insulator 18, and it is connected at its upper end by a wire conductor 24 to the overhead line 10 through the conductor 20 and at its other end by a wire conductor 26 to the ground side of the pothead insulator 18 which is shown directly connected to a ground electrode (not shown) by the ground wire 28. As seen, the pothead insulator 18 and the arrester 22 are supported on the pole 14 by the bracket 30.

In a practical design for a power line having a line voltage of 11 kV, the wires 24 and 26 may be less than 300 millimeters in length, and the inductance of this path is such that several thousand volts may be dropped across each of the wires 24, 26 during the rapid current rise resulting from a lightning strike upon the power line 10. The sum of these voltage drops necessarily appears across the pothead insulator, in addition to the voltage drop remaining across the surge arrester 22 in its low impedance state. The combined voltage in the conductor 16 resulting from a lightning strike may in some cases be sufficient to cause a failure of the pothead insulator or the cable it terminates and will, in all cases, accelerate the degradation of the insulation of the pothead, the cable and the apparatus, such as the transformer, to which the cable is connected.

It is known that this problem can be significantly reduced by rearranging the connections at the upper end of the assembly as shown in FIG. 2, and this combination is sometimes employed. As seen in FIG. 2, the upper end of the surge arrester 22 is directly connected to the overhead line 10 by the conductor 24 and the cable conductor 16 is connected to the top end of the surge arrester 22 by the wire 20, instead of directly to the line 10. Because the wire 24 does not carry the current flowing through the surge arrester 22, the voltage drop across it is comparatively very small. The voltage drop across the wire 24 is immaterial, because it is not applied to the pothead insulator 18. However, this solves only half the problem, because the connecting wire 26 remains at the ground side of the assembly.

Figure 3:
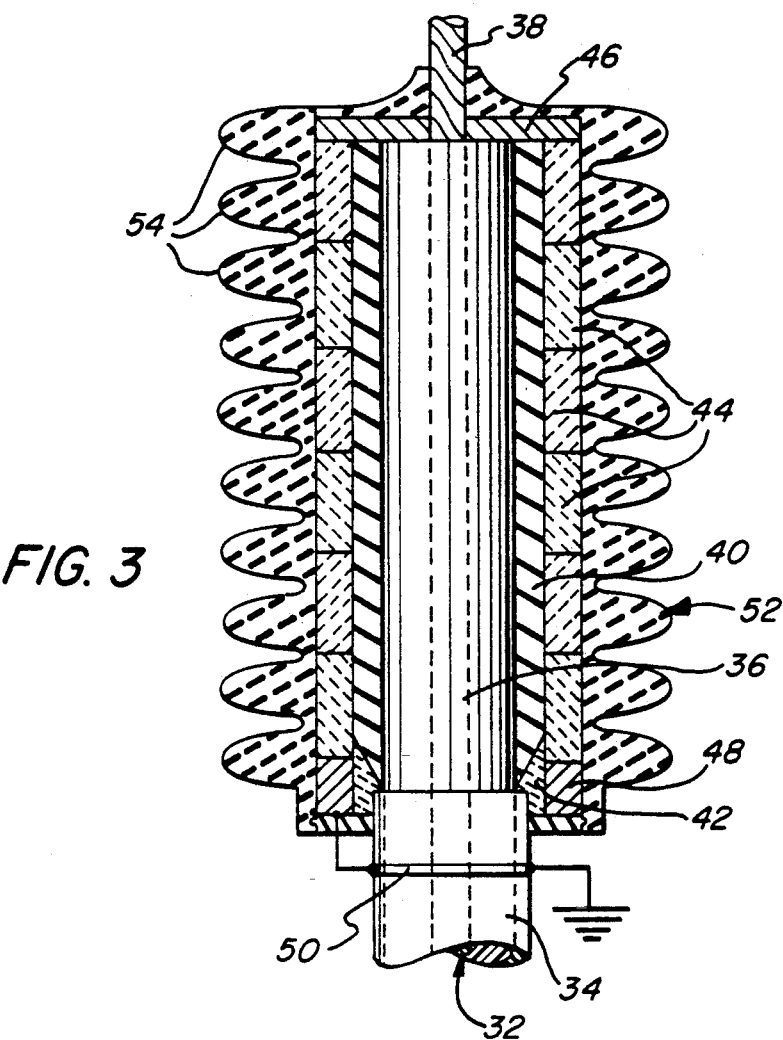
FIG. 3 is a cross sectional view of a protective device embodying the present invention with the conductor fragmentarily illustrated.

FIG. 3 shows a preferred form of protective device embodying the present invention as embodied in a pothead insulator. The insulated conductor generally designated by the numeral 32 is stripped back in the usual way to remove the outer protective and screening layers 34, exposing a length of cable dielectric layer 36 and the dielectric layer 36 is removed to expose a length of the conductor wire 38 for connection to the overhead line (not shown) by a simple wire connection (not shown). The exposed portion of the cable dielectric layer 36 is surrounded by a simple tubular insulator 40 which has no need for either anti-tracking properties or of sheds since it is not exposed to the atmosphere, but which needs to be in intimate contact with the insulation 36. The tubular insulator 40 may include any conventional form of stress relief device, such as diagrammatically illustrated at 42.

The tubular insulator 40 and the stress relief device 42 are enclosed by a concentric stack of rings 44 fabricated from a conventional voltage dependent resistance metal oxide ceramic material such as zinc oxide. The stack of rings 44 is terminated by a conductive washer 46 at the upper or high voltage end and by a conductive ring 48 at the lower or ground end, which also function as common terminals for the insulator 40. As shown, the ring 48 is connected to the cable screen 50 and to ground in any appropriate manner. The rings 44 must, as in any surge arrester, be kept in efficient electrical contact with each other and with the metal washer 46 and conductive ring 48.

The protective device is completed by a molded annular insulator generally designated by the numeral 52, which is conveniently molded from a cycloaliphatic epoxy resin composition suitable for outdoor use under electrical stress or from track-resistant rubber compounds, such as silicone or ethylene-propylene-diene monomer (EPDM). As is conventional, the insulator 52 is molded with a multiplicity of "sheds" or undulations 54 to ensure an adequate surface leakage path and to avoid breakdown through surface flashover.

By this arrangement, connecting leads to a surge arrester are effectively completely eliminated at both ends of the assembly; the slight conductivity of the rings 44 at normal service voltages contributes to maintaining a very satisfactory electrical stress gradient not only at the surface of the cable dielectric 36 but also at the surfaces of the insulator 52. Only one component has to be stocked and applied, reducing stocking and installation times. Moreover, the elimination of separate surge arrester in the installation and it connections is considered to provide an aesthetic improvement.

Thus, it is clear that this invention embodies the functions of a pothead and those of a surge arrester, each becoming more effective because of the following advantages:

1. The protection level (maximum voltage across its terminal when diverting a surge of the surge arrester function has been optimized by eliminating altogether the lead lengths.

2. An excellent voltage distribution has been achieved over the length of the cable termination by means of the nonlinear metal oxide resistors.

3. For most applications in the medium and moderately elevated voltage ranges, the need for a stress relief device has been eliminated.

4. The surface of the pothead/arrester combination has been made less vulnerable to the adverse effects of atmospheric contamination because of the effective voltage grading provided by the nonlinear blocks.

Figure 4:
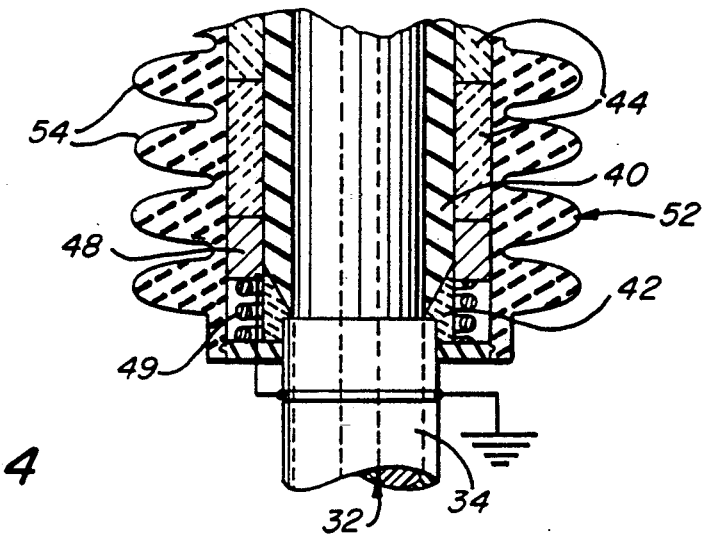
FIG. 4 is a fragmentary sectional view of a modification of the device of FIG. 3.

In FIG. 4, there is seen a modification of the device of FIG. 3 in which a coil spring 49 biases the conductive ring 48 upwardly to ensure optimum electrical contact of the ring 48 with the rings 44, and of the rings 44 with the washer 46.

The present invention is not restricted to the termination of insulated cable connections to overhead lines. In FIG. 5, the present invention is applied to a connection between an overhead line (not shown) and a transformer or other apparatus generally designated by the numeral 60 (not shown) contained in a metal housing 62 which is only fragmentarily illustrated. The device here functions as a bushing in which the conductor at elevated voltage is fed through a metal opening generally maintained at ground potential. The conductor now consists of a piece of insulated and shielded high voltage cable, the shield of which is cut back at both ends.

One end of the conductor 64 is attached to the overhead line (not shown), and the conductor 64 extends through the protective device 66 which is in all essential construction identical to the protective device of FIG. 3. The device 66 is secured in a recess in the metal flange 68 which is bolted to the opening wall 70 of the housing 62 and a seal between the flange 68 and the opening wall 70 is provided by an O-ring 72. As shown, the housing 62 of the device 60 is connected to ground. On the inside of the housing 62, the insulated conductor 64 is fitted with a conventional stress relief device 74.

The present invention may also be applied to installations where elbow connections are desired, such the connection between medium voltage cables and distribution as transformers. In FIG. 6, there is illustrated a prior art elbow connector which has a medium voltage insulated conductor 80 with a metal sleeve connector 82 crimped onto the central conductor. A conductive probe 84 extends at a right angle from the connector 82 and is configured and dimensioned to engage in female bushing of a distribution transformer (not shown). As seen, the semi-conducting housing 86 of the elbow connector provides an L-shaped passage therethrough. The connector 82 and its juncture with the probe 84 are disposed within a semi-conducting insert 88 which reduces the electric stress around the sharp edges. An elastomeric insulating material 90 fills the cavity of the housing 86 about the components.

In FIG. 7 is shown a prior art elbow surge arrester which has a housing 92 of semi-conducting shield material into which extends the metal probe 94 which terminates in the semi-conducting shield 96. Electrically coupled to the probe 94 and extending at a right angle therefrom is a stack of cylindrical blocks 98 of a ceramic non-linear metal oxide resistor (varistor). At the opposite end of the stack is a coiled spring 100 to ensure good electrical contact, and a conductor 102 extends to ground. Around the blocks 98 and probe 94 in the cavity of the housing 92 is an insulating material 104.

Figure 8:
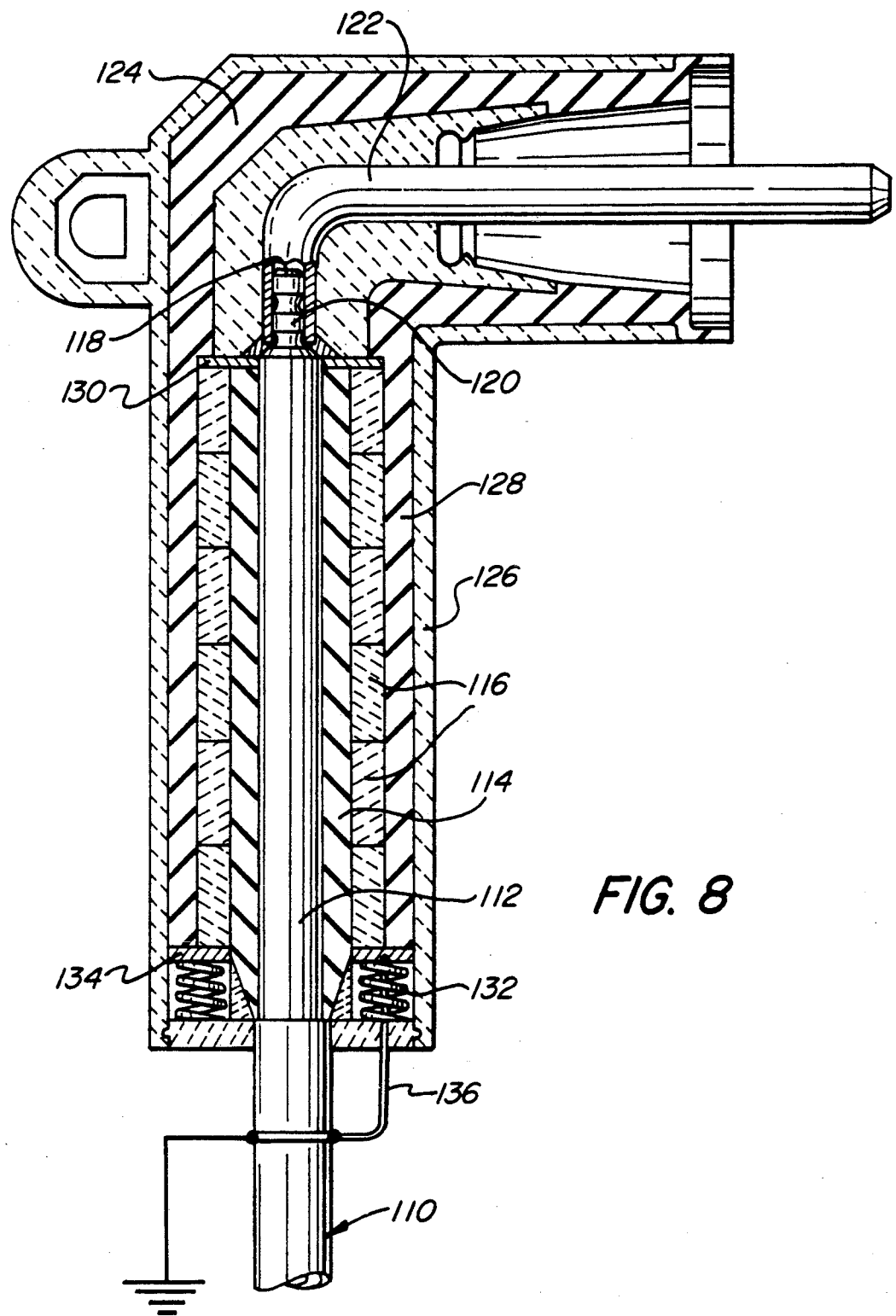
FIG. 8 is a cross sectional view of an elbow device embodying the present invention.

Turning now to FIG. 8, therein is illustrated an elbow connector/arrester embodying the present invention and comprising a modification of the device illustrated in FIG. 3. The outer protective and screening layers of the conductor 110 are removed to expose the dielectric layer 112 which is surrounded in intimate contact by an insulating sleeve 114. This sleeve 114 in turn is surrounded by a stack of rings 116 of a voltage dependent resistance metal oxide ceramic material. The conductor core 118 has a plug in connector 120 crimped thereonto, and the connector 120 sits in the probe 122 which is seated in the semi-conductor insert 124. The housing 126 is also fabricated from a semi-conductor material. A layer 128 of an insulating material fills the spacing between the wall of the housing 126 and the stack of rings 116, the probe 122 and the insert 24.

At the top of the stack of rings 116 is a metal washer 130 which electrically connects them to the conductor core 118 through the connector 120. The lower end of the stack of rings 116 is biased upwardly by a coil spring 132 acting on the metal ring 134 which is electrically connected to ground by the conductor 136.

Thus, it can be seen that protective devices of the present invention comprise a tubular insulator through the center of which a voltage carrying conductor passes and which, when in service, will be exposed to the voltage of the conductor at one of its ends and to an earth (ground) voltage at its other end. A surge arrester is disposed about the insulator and is electrically connected in parallel with the tubular insulator, by common terminals at their ends.

In the preferred embodiment, the surge arrester is tubular and concentrically surrounds the tubular insulator, which provides the additional advantage that the surge arrester may contribute to electrical stress grading of the termination. In some lower voltage ranges, it may supply the sole stress-grading means, while in other cases, conventional stress-grading means can be provided inside or adjacent to the end of the tubular insulator.

The surge connector may be fabricated from a stack of toroidal rings of conventional metal oxide voltage-dependent resistance semi-conductor material such as zinc oxide (varistors). However, semi-circular blocks or otherwise segmented rings can be used to impart a degree of radial resilience; in such a construction, the abutting ends of the segments in adjacent rings may be aligned or staggered.

The protective device may include an outer enclosing insulator either assembled with it or, in the case of a polymeric insulator, molded around it. The outer insulator will usually be formed with "sheds" or other contours to increase the electrical leakage path.

Thus, it can be seen from the foregoing detailed description and attached drawings that the protection devices of the present invention combine cable termination and surge arrester functions in a simple but effective way so as to increase the protection level attainable and to reduce installation time. In the preferred devices, voltage distribution is improved over the length of the cable termination, and the effective voltage grading makes the device less vulnerable to the adverse effects of atmospheric contamination. The device may be employed in several forms to effect cable terminations in typical pothead connections to overhead transmission lines, and in bushing connections and elbow connections to various electrical apparatus.

Having thus described the invention, what is claimed is:

1. An electric protective device for a high voltage cable termination from an overhead transmission line comprising:
   (a) a tubular insulator through the center of which a voltage carrying conductor passes and which, when in service, will be exposed to the voltage of the conductor at one of its ends and to a ground voltage at its other end; and
   (b) a surge arrester concentrically disposed about said tubular insulator, said insulator and surge arrester having common terminals at their ground and high voltage ends.

2. The electric protective device in accordance with claim 1 wherein the surge arrester is of tubular configuration and disposed concentrically about said tubular insulator.

3. The electric protective device in accordance with claim 2 wherein there is included an outer insulator disposed about said surge arrester.

4. The electric protective device in accordance with claim 1 wherein said surge arrester contributes to electrical stress grading of the termination.

5. The electric protective device in accordance with claim 4 wherein said surge arrester provides all stress grading in the device.

6. The electric protective device in accordance with claim 1 wherein said surge arrester is comprised of a stack of rings of a semi-conductor voltage dependent resistance material.

7. The electric protective device in accordance with claim 6 in which conductive elements extend across ends of said surge arrester and insulator to provide said common terminals therefor.

8. The electric protective device in accordance with claim 7 in which there is included spring means biasing said rings into good electrical contact with each other and with said common terminals.

9. An electric protective device for a high voltage cable termination from an overhead transmission line comprising:
   (a) a tubular insulator through the center of which a voltage carrying conductor passes and which, when in service, will be exposed to the voltage of the conductor at one of its ends and to a ground voltage at its other end;
   (b) a surge arrester of tubular configuration disposed concentrically about said tubular insulator electrically connected in parallel with said tubular insulator;
   (c) conductive elements extending across the ends of said insulator and surge arrester providing common terminals therefor; and
   (d) an outer insulator about said surge arrester.

10. The electric protective device in accordance with claim 9 wherein said surge arrester is comprised of a stack of rings of a semi-conductor voltage dependent resistance material.

11. The electric protective device in accordance with claim 10 in which there is included spring means biasing said stack of rings and conductive elements into good electrical contact with each other.

* * * * *